UNITED STATES PATENT OFFICE.

PAUL EHRLICH AND LUDWIG BENDA, OF FRANKFORT-ON-THE-MAIN, GERMANY, ASSIGNORS TO FARBWERKE VORM. MEISTER LUCIUS & BRÜNING, OF HÖCHST-ON-THE-MAIN, GERMANY, A CORPORATION OF GERMANY.

ARSENO COMPOUND.

1,028,101.

Specification of Letters Patent.   Patented June 4, 1912.

No Drawing.   Application filed August 7, 1911. Serial No. 642,866.

*To all whom it may concern:*

Be it known that we, PAUL EHRLICH, M. D., professor of medicine, and LUDWIG BENDA, Ph. D., chemist, citizens of the Empire of Germany, residing at Frankfort-on-the-Main, Germany, have invented certain new and useful Improvements in New Arseno Compounds, of which the following is a specification.

We have found that the 4-amino-3-oxy-arylarsinic acids can be converted by treatment with reducing agents into hitherto unknown diamino derivatives of the 3-oxy-aryl-arseno-3-oxy-aryls, corresponding to the formula:

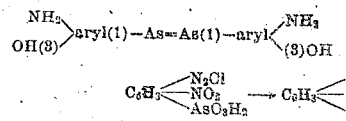

The diamino derivatives of the 3-oxy-aryl-arseno-3-oxy-aryls obtainable from 4-amino-3-oxyarylarsinic acids by the action of reducing agents, are yellowish powders scarcely soluble in water, but readily soluble in alkalis and also in diluted hydrochloric acid; they melt with decomposition; when treated with nitrite and hydrochloric acid they yield yellow-colored diazo compounds. Their solution in hydrochloric acid gives with addition of sulfuric acid a difficulty-soluble sulfate. When treated with zinc and hydrochloric acid, they are split up with formation of 4-amino-3-oxyarylarsins. They are isomers of the products described in U. S. Patent No. 986,148, these latter products containing the hydroxyl group in "para" position, but the new ones in "meta" position to the arseno group.

The process for the production of the new arseno compound is for instance as follows: 500 gr. sodium 4-amino-3-oxyphenyl-arsinate are dissolved in 5 liters of water and 2 liters of a solution of normal caustic soda-lye and stirred with one kilo of anhydrous sodium hydrosulfite. This mixture is heated for some hours to 60–65° C., whereupon 4.4-diamino-3.3-dioxyarsenobenzene separates in yellow flakes. For purifying the product and converting it into the chlorhydrate, which is soluble in water, the arseno compound may be dissolved in alcoholic hydrochloric acid and the filtered solution precipitated with ether. It is advantageous to effect these operations without access of air. The free arseno compound forms a yellow powder, which is scarcely soluble in water, but very readily soluble in diluted mineral acids and alkalis. Its hydrochlorid solution yields, on addition of sulfuric acid, a difficultly-soluble sulfate, and when treated with nitrite, a yellow diazo compound which, when combined with 1.8.4 aminonaphtholsulfonic acid, yields in a solution alkaline with soda a blue solution.

these new products being of great therapeutical value, because they have a bactericidal action upon spirillæ and trypanosomes. The aforesaid 4-amino-3-oxy-arylarsinic acids can be prepared by treating the diazotized 3-nitro-4-amino-arylarsinic acids with acid-binding agents, combining the 3-oxy-4-diazo-arylarsinic acids thus produced with azo components (such as 2-naphthol, resorcin, dioxynaphthalene sulfonic acids, aminonaphtholsulfonic acids) so as to form azo dyestuffs, and then splitting up the latter by the action of reducing agents until they are discolored. These reactions may be interpreted for instance by the following formula:

$$C_6H_3 \begin{array}{l} N_2Cl \\ NO_2 \\ AsO_3H_2 \end{array} \rightarrow C_6H_3 \begin{array}{l} N_2Cl \\ OH \\ AsO_3H_2 \end{array} \rightarrow C_6H_3 \begin{array}{l} N_2C_{10}H_5OH \\ OH \\ AsO_3H_2 \end{array} \rightarrow C_6H_3 \begin{array}{l} NH_2 \\ OH \\ AsO_3H_2 \end{array}$$

Having now particularly described our invention, what we claim is:

1. As new products, the diamino derivatives of the 3-oxy-aryl-arseno-3-oxyaryls, being yellowish powders, scarcely soluble in water but readily soluble in alkalis and diluted hydrochloric acid, and melting with decomposition; said products yielding with nitrite and hydrochloric acid yellow diazo compounds, and their hydrochlorid solution with addition of sulfuric acid a difficultly-soluble sulfate; being split up when treated with zinc and hydrochloric acid, forming then 4-amino-3-oxyarylarsins.

2. As a new product, the symmetrical 4.4-diamino-3.3-dioxyarsenobenzene, being a yellowish powder, scarcely soluble in water but readily soluble in alkalis and also in diluted hydrochloric acid, and melting with decomposition; said product yielding with nitrite and hydrochloric acid a yellow diazo compound, and its hydrochlorid solution with addition of sulfuric acid a difficultly-soluble sulfate, being split up when treated with zinc and hydrochloric acid, forming then 4-amino-3-oxyphenylarsin.

In testimony whereof, we affix our signatures in presence of two witnesses.

PAUL EHRLICH.
LUDWIG BENDA.

Witnesses:
  JEAN GRUND,
  CARL GRUND.